United States Patent [19]

Giraudy

[11] Patent Number: 5,414,429
[45] Date of Patent: May 9, 1995

[54] DEVICE FOR CONVERTING OUTPUT DATA OF A RADAR FOR THE DISPLAY THEREOF ON A TELEVISION SCREEN

[75] Inventor: Bernard C. Giraudy, Taverny, France

[73] Assignee: Sopelem-Sofretec, Bezons, France

[21] Appl. No.: 50,884

[22] Filed: Apr. 21, 1993

[30] Foreign Application Priority Data

Jun. 18, 1992 [FR] France .................. 92 07423

[51] Int. Cl.⁶ .............................................. G01S 7/531
[52] U.S. Cl. ...................................... 342/185; 342/176
[58] Field of Search ................................ 342/176, 185

[56] References Cited

U.S. PATENT DOCUMENTS

| | | | |
|---|---|---|---|
| 4,305,073 | 12/1981 | Curry, Jr. et al. | 342/185 |
| 4,330,781 | 5/1982 | Giustiniani et al. | 342/185 |
| 4,754,279 | 6/1987 | Cribbs | 342/185 |

*Primary Examiner*—Gilberto Barrón, Jr.
*Attorney, Agent, or Firm*—Martin Smolowitz

[57] ABSTRACT

A device for converting data for display on at least one television screen associated with a videographic memory, the output signals of the radar comprising at least one videographic signal and scanning data, the device comprises a processor for processing the different radar output data, an analog/digital converter for digitizing the videographic signal, a videographic signal converter for compressing the digitized videographic signal, a distance marker generator for generating distance markers, a polar to Cartesian converter for converting the standard of the coordinates of the data contained in the signal from a polar coordinate system into a Cartesian coordinate system, an intermediate memory for receiving and storing the compressed videographic signal and the distance markers, an output buffer memory for receiving and storing the output signals of the intermediate memory and the polar to Cartesian converter and an interface for controlling the memory as a function of the data contained in the buffer memory. The device includes an after glow processor connected to the interface, for controlling the contents of zones of videographic memory to produce an after glow phenomenon of certain points of the radar image.

2 Claims, 4 Drawing Sheets

| | | |
|---|---|---|
| B0300000<br>B0301FFC | D7 to D0<br>on 8 bits | 2K x 8 bits<br>R/W |
| B0400000 | YYYY YYYY -- YYY xxx xxxx xxxx -- dd dddd | FIFO<br>R |
| B0500000 | | LUT<br>R/W |
| B0600000 | | |
| B0600004 | | |
| B060000C | d0<br>d1<br>d2<br>d3<br>d4<br>d5<br>d6<br>d7 | 1<br>1 / 0<br>PC /<br>V1 / V2<br>IFF /<br>FLASH /<br>DIST /<br>ANGLE /<br>SEP /<br>/ 1024<br>W |
| B060000C | D7 to D0<br>d0<br>d1<br>d2<br>d3<br>d4<br>d5<br>d6<br>d7 | R |
| B0600010 | YYYY YYYY YYYY YYYY xxxx xxxx xxxx xxxx<br>1111 1100 0000 0000 1111 1100 0000 0000<br>5432 1098 7654 3210 5432 1098 7654 3210 | |
| B0600014 | D7 to D0 | |
| B0600018 | D5 to D0 | |
| B060001C | D1 D0 | 2<br>1 / 0<br>/<br>W |

FIG. 2

DEVICE FOR CONVERTING OUTPUT DATA OF A RADAR FOR THE DISPLAY THEREOF ON A TELEVISION SCREEN

BACKGROUND OF THE INVENTION

The present invention relates to a device for converting output data of a radar for the display thereof on at least one television screen.

More particularly, this device is employed for displaying the data on a television screen associated with at least one videographic memory.

More generally, the converting device proposed permits displaying on a standard television screen having an X, Y scanning, i.e. in Cartesian coordinates, images issuing from a sensor operating in i.e. in polar coordinates. This sensor is usually a radar antenna associated with its control electronics and, in the art, the consoles employed for the display of these radar images directly receive the different data, and in particular the videographic output signal of this radar. However, these consoles are relatively rudimentary and the quality of the image displayed is not very good.

Further, the possibilities of extension of the utilization, in particular of the radar imagery, are also relatively limited due to the structure of these consoles, and in particular the display screen and its control electronics.

SUMMARY OF THE INVENTION

An object of the present invention is therefore to overcome these problems by permitting the display of these images on a television screen, while respecting the ergonomics of the conventional consoles and conserving the quality of the imagery related to the remanence of the phosphors employed in these conventional consoles.

The invention therefore provides a device for converting output data of a radar for the display on at least one television screen associated with a videographic memory, the output signals of the radar comprising at least one videographic signal and scanning data, the device comprises a processor for processing the different radar output data, an analog/digital converter for digitizing the videographic signal, a videographic signal converter for compressing the digitized videographic signal, a distance marker generator for generating distance markers, a polar to Cartesian converter for converting the standard of the coordinates of the data contained in the videographic signal from a polar coordinate system into a Cartesian coordinate system, an intermediate memory for receiving and storing the compressed videographic signal and the distance markers, and output buffer memory for receiving and storing the output signals of the intermediate memory and the polar to Cartesian converter, an interface for controlling the videographic memory as a function of the data contained in the buffer memory and an after glow processor connected to the interface for controlling the contents of zones of videographic memory.

A better understanding of the invention will be had from the following description, which is given solely by way of example, with reference to the accompanying drawings.

BRIEF DESCRIPTION OF THE DRAWINGS

FIG. 2 is a table of VME addresses employed by the converting device according to the invention;

DESCRIPTION OF THE PREFERRED EMBODIMENT

The data converting device according to the invention is intended to be used for converting output data of a radar and permitting the display thereof on at least one television screen associated with a videographic memory.

Figure 1:
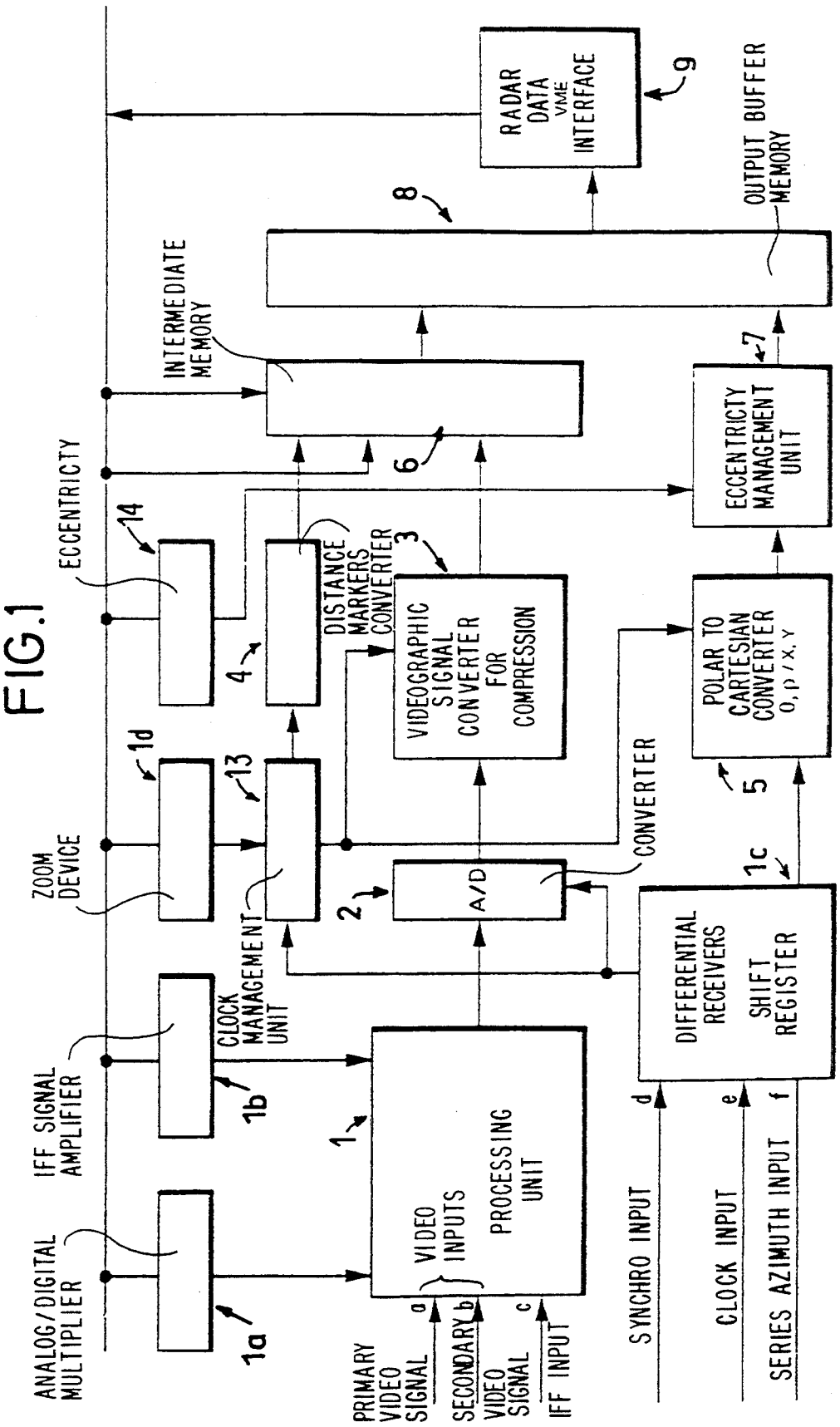
FIG. 1 is a block diagram illustrating the operation of a converting device according to the invention.

As can be seen in FIG. 1, the different output data of the radar further comprising at least one videographic signal and scanning data, are applied to the input of processing unit 1. The device of which forms what is called a radar interface comprising different analog and digital circuits effecting a pre-processing of the radar signals so that they may be employed by the rest of the circuits of this device. Generally, these signals comprise at least:

two videographic inputs (primary and secondary), a, b;

an IFF input, c;

a synchro input d; and a series azimuth input f.

The primary and secondary videographic signals pass through an amplification circuit which is within processing unit 1 in order to have a correct amplitude at the input of analog/digital converter 2 which will be described in more detail hereinafter.

The gain of the videographic signals is controlled digitally by an analog/digital multiplier 1a which conserves the pass band and whose gain value is determined by a register.

The videographic signals a and b are multiplexed and the choice of the videographic signal to be processed is made under the control of a control unit, per FIG. 3, which will be described in more detail hereinafter.

Figure 3:
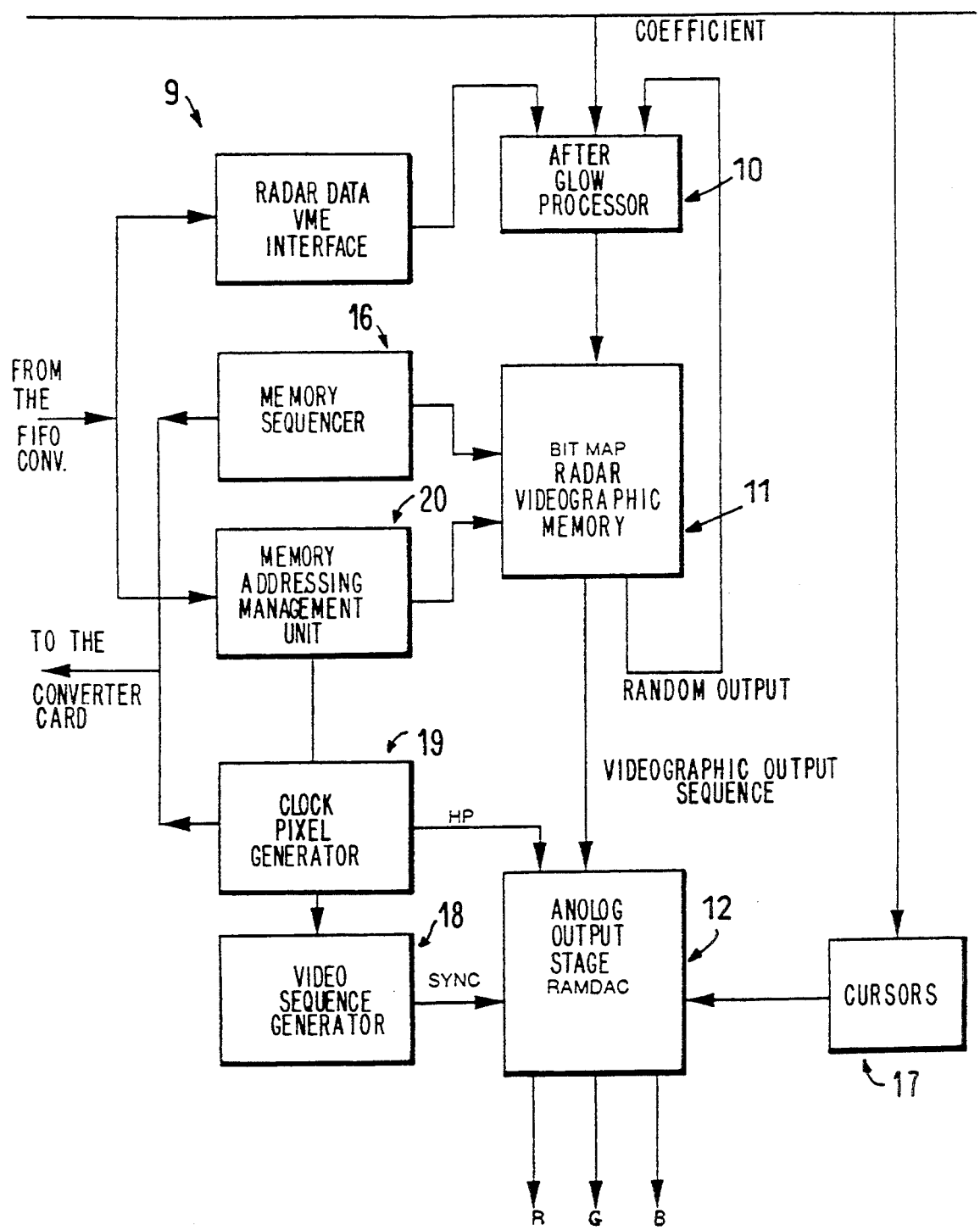
FIG. 3 is a block diagram illustrating the operating of an after glow processor which is part of the structure of a control unit according to the invention.

The IFF signal, after amplification is adjustable by IFF signal amplifier 1b, and is mixed with the videographic signal selected before digitization and its presentation is subjected to the choice of the operator by a selection by means of the control unit per FIG. 3. Furthermore, a zooming device 1d, provides conventional functions of enlargement of certain parts of the radar image.

Lastly, the azimuth signal and its associated clock e are put into form in differential receivers such as commercially available differential amplifiers, before being sent to a shift register, generally designated by 1c.

An azimuth signal f, is at the output of the latter in parallel form and this signal is used, as will be described in more detail hereinafter, in polar to Cartesian converter 5 for converting the standard of the coordinates of the data contained in the videographic signal.

After passage through the previously-described processing unit 1, the videographic signal is applied to the input of the analog/digital converter 2 for digitizing. At this point, the sampling is effected at a fixed frequency so that it is possible to process pulses corresponding to the minimum pulse width of the radar, the signals of which are to be displayed. As an example, a 10 MHz clock is used and allows the digitization of pulses which width is 200 ns.

The analog/digital converter 2 is associated with video signal converter 3 for compressing the videographic signal so as to digitize solely that which is displayable on the screen and thereby reduce the amount of data to be processed.

Thus, when the number of samples along an image radius is higher than the possible definition of the display, the radar data is grouped, i.e. the maximum amplitude level of the videographic signal is taken from among N samples.

As an example, for a given scale and a frequency of 10 MHz, there are 2,048 samples along each radar radius. There is then effected a grouping of the order 2 and only the maximum amplitude among two successive samples is taken.

For this purpose, it is necessary to construct a clock whose frequency varies as a function of the chosen type of radar and scale. This clock is modified by the clock management unit 13. The maximum amplitude of the N samples is detected in real time at the output of the analog/digital converter 2 by the videographic signal converter 3.

Further, the variable clock management unit 13 is also employed by distance marker generator 4.

A perfect concordance results between these markers and the digitized videographic signal. The digitized videographic signal and the markers are then employed for addressing a rapid static intermediate memory 6 which will be described in more detail hereinafter, and which permits, in accordance with its contents, checking a certain number of elements of the display and for example, the luminosity of certain markers, the adjustment of the zero level of the videographic signal so as to allow suppression of noise, etc.

Note that a table of the correction of the amplitudes of the radar videographic signal could also be written so as to modify the transfer function of the digitization line (logarithmic response, etc .... ).

The converting device further comprises polar to Cartesian converter 5 for converting the standard of the coordinates of the data contained in the videographic signal from a polar coordinate system into a Cartesian coordinate system.

This permits effecting the sample writings directly in the physical space of the videographic memory.

These different converting operations are carried out in real time and are timed by a variable clock management unit 13, only the coordinates of the previously selected points being calculated.

At the output, these different coordinates are modified in accordance with the position of the radar with respect to a display unit, etc .... so as to obtain coordinates pertaining to the physical space of the videographic memory.

The intermediate memory 6 receives the output signals of the distance marker generator 4 and the videographic signal converter 3 for compression.

The converting device as per the assembly shown in FIG. 1, also comprises an output buffer memory 8, receiving the output signals of the intermediate memory 6 and the polar to Cartesian converter 5 through the eccentricity management unit 7. Furthermore, memory 8 permits interchange between the converting device shown in FIG. 1 and the control unit shown in FIG. 3.

This output buffer memory 8 may be formed by memories of the first in, first out (FIFO) type permitting asynchronous accesses at variable frequency between the polar to Cartesian converter 5 and the control unit.

The abscissa and the ordinate of the points of a radar radius and the amplitude of the associated videographic signal are available at the input of output buffer memory 8.

This group of data forms a word of 32 bits which is read by the control unit formed by for example, any suitable device, such as an automatic writing means in the videographic memory, depending on the chosen option.

In order to limit the number of transfers to be effected, only the amplitude points different from 0 are writing in the output buffer memory 8 and it will be noted that the number of written points largely depends on the adjustment of the threshold suppressing the background noise of the videographic signal.

It will be observed that this converting device may be used in a standard work station in which the displays may employ the well-known computer standards of the types, VME, UNIX, X-WINDOWS, GKS, etc. . . . .

In this case, the output of the output buffer memory 8 is for example, connected to an interface of type VME 9, which permits transmission of the different control orders to the different circuits of the converting device and control the display of the images by controlling the videographic memory.

There is then no processing during the conversion by the host calculator, which permits working in virtually real time.

Various input-output addresses have been reserved in the extended addressable space, for example of a Unigraph as can be seen in particular in FIG. 2.

NORVAM address

A non-volatile memory of 2K of 8 bits enabling the converting device to save the current display parameters. When turning it on, it is initialized by means of the parameters is had stored before it was cut off. This memory is accessible by the host calculator in reading and writing.

FIFO address

Causes the word by word reading of the information addresses/data calculated by the converting device.

Intermediate memory address

Permits modifying the contents of this memory (luminosity markers, SEP, course flash . . . ).

Video gain address

Permits adjusting the luminosity of the real video; 256 values are possible.

IFF gain address

The same function as the video gain.

State 1 (status 1) register address

Being accessible in writing, this register permits modifying the displayed videos.

In reading, this register constitutes the state of the FIFO.

Eccentricity address

Register containing the system coordinates of the radar center.

Zoom address

Register containing the value of the scale selected for the display.

SEP address

Register containing the radius of the zone of suppression of the near module echo of 8 screen pixels; 64

State 2 (status 2) register address writing

Servitude register permitting among other things the activation of the resetting of the pointers of the FIFO.

There may also be effected a mixture of real-synthetic data in the region of a VMCG2a graphic card, by means of the data calculated by the polar to Cartesian converter 5 and temporarily stored in the output buffer memory 8.

As can be seen in FIG. 3, a direct display may also be provided.

Indeed, as the principle of the writing of the radar data in the graphic card of the Unigraph via the VME bus imposes limitations on the definition and the scanning rate of the radar, a direct display option may also be employed.

It permits among other things the display of the radar data by using 6 bits, namely 64 levels, which enables appreciating the difference when rendering and presenting the image. An after glow processor 10 (shown in FIG. 3) is connected to a radar videographic memory 11 so as to allow a display close to that obtained on a conventional directed beam screen.

A memory addressing management unit 20, has as its function, control of the addressing of memory 11 in a conventional manner and also generating the sequential addresses.

As can also be seen in FIG. 3, the sequential addresses, i.e. display addresses of the TV lines, are generated from the videographic output sequence. As the latter depends on the definition, the use of programmable circuits is consequently necessary.

The base frequency of the clock point is for example, 120 MHz for a 1280×1024 pixels format.

The following table gives the different times of the videographic sequence.

| Signal | 1280 × 1024 |
| --- | --- |
| Vertical frequency | 60 Hz |
| Raster blanking duration | 656,8 µs |
| Line duration | 15,64 µs |
| Line blanking duration | 4,97 µs |
| Useful line duration | 10,67 µs |

The video sequence generator 18, which generates the video sequence for the display addresses in combination with the clock pixel generator 19, synchronize the writing of the radar data with the videographic sequence by generating the signals required for reading back of the output buffer memory 8.

A memory sequencer 16 generates all the signals required for the control of the radar videographic memory 11 and the division of the memory bus for the three types of access to this memory.

These three accesses are:

sequential access, i.e. the loading in the output offset registers, of the contents of the videographic lines so as to transmit them to the output digital/analog converter.

radar access, i.e. the generation of the reading signal of the buffer memory 8 and the management of the conditional writing in the radar videographic memory 11. Indeed, the radar data must not be systematically rewritten, since the data of a radar spot could be crushed by the noise. In the course of this access, the data is therefore only written if the latter is superior to that present in the considered address.

After glow processor 10 access, i.e. the generation of the control signals required for the after glow processor 10.

The radar videographic memory 11 permits the random storage of the radar data which will be read back sequentially for display.

The components employed for constructing this memory may be constituted by videographic RAM memories having a 256 K capacity of 4 bits comprising an output shift register, which permits loading in the register the data of a videographic line in one RAM cycle. The rest of the time, the memory is available for the writing of the radar videographic signal by the after glow processor 10.

In order to avoid the use of an excessively fast shift clock, the memory is divided in the parallel form into eight pages timed by a clock of 120 MHz divided by 8, i.e. 15 MHz.

Eight pixels every 67 ns are then delivered at the output of this memory, these points being put in series by the videographic output stage.

The resetting of the radar videographic memory 11 is necessary for the presentation upon each rotation of the real situation. This, added to the ergonomic utility of the after glow of the phosphors used in the conventional directed beam scanning, led to the realization of a pseudo after glow of the data display.

The observation of the visual phenomena due to the asynchronism of the two types of scanning, namely radar and television, and the physiology of the human eye, permitted the realization of a simple and high-performance algorithm, such as known, for example, from U.S. Pat. No. 4,829,308, enabling an excellent rendering of the after glow effect to be obtained.

Of course, the fact that this effect is obtained numerically in the radar videographic memory authorizes the use of laws, a mathematical treatment formula such as is known, for example, from U.S. Pat. No. 4,580,164, of any decrease in the luminosity both as concerns space and time, up to an infinite after glow which is very useful for effecting the trace of the history of the trajectories of mobile echos.

The best rendering of the after glow effect is obtained with bits of data to be displayed.

This after glow processor 10 then processes the content of certain zones of the radar videographic memory in accordance with a given law, a mathematical treatment formula, so as to produce a pseudo-after glow phenomenon of certain points of the radar image displayed on the screen.

The analog output stage, 12 in FIG. 3, is adapted to convert into analog, the contents of the radar videographic memory and produce videographic R, G, B and TV synchro signals for controlling the monitor.

This stage further permits defining the desired palette of pseudo-colours. A value chose among 16.8 million possibilities corresponds to a given videographic level.

Therefore, there are available at the output, 64 colours with 6 radar bits (16 colours with 4 radar bits)

among the possible 16.8 million. This palette of pseudo-colours is loaded via the VME bus.

The analog output 12 also controls three different cursors 17, two of which are completely definable in a 64×64 matrix, the last being a cross. The colour of these cursors is also programmable.

As the radar videographic memory 11 is divided into 8 parallel pages, the analog feature of the output stage 12 places in series format, the 8 points for displaying a videographic point in pseudo-colours every 8.3 ns in the 1280×1024 format.

The output videographic signal is available in analog form with as amplitude 0.7 V for the R and B outputs and 0.7 plus 0.3 V of synchronization on the G output, permitting synchronization of the monitor.

All programs of the analog output stage 12, bearing in mind the memories of the colours, the forms and the positions of the cursors, are effected via the VME bus.

The radar data converting device is in fact constructed in the form of a module of two cards in the long double Europe format which is integrated into the card rack of a Unigraph. This device respects the VME interface.

The basic converting device requires only a single card for the realization of the initial configuration, this card receives its controls via the VME bus and delivers the data in Cartesian coordinates after calculation.

This card uses components of the VLSI type in CMOS technology, most of the latter being reconfigurable by an exterior PROM, permitting, for example, the easy modification of the display standard. It may be achieved with cabled technology.

All of the direct display is in the form of a daughter card which may be connected to the basic converting device.

It groups all the memories, the sequencer, the after glow processor, the pixel clock, etc.

Owing to the high operating frequencies, it is formed on a printed circuit card having for example, six layers.

It will therefore be understood that the converting device according to the invention, permits the display of a complete radar image on a monitor employing an X, Y scanning, for example, having a high definition.

The invention also permits the simultaneous display of a plurality of complete or partial radar images on the same monitor, the radars being located at a distance from one another.

Figure 4:
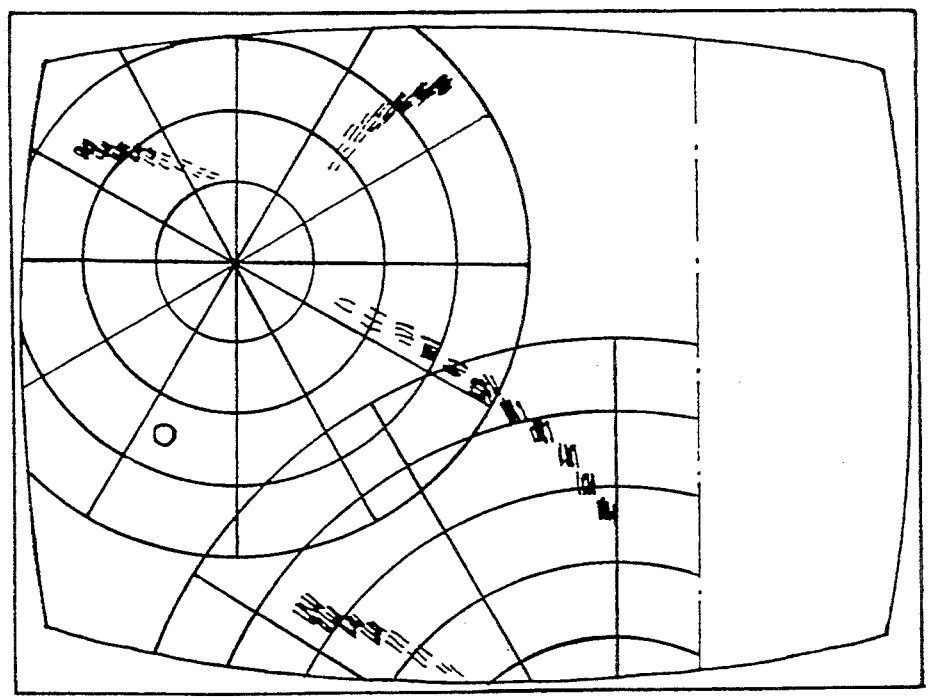
FIG. 4 shows a screen of a monitor on which two radar images are displayed simultaneously.

FIG. 4 gives an example of the simultaneous display of two radar images which permits for example, following without discontinuity, the trajectory of an aircraft or a missile which flies in succession in the fields of the two radars.

It is possible to envisage the simultaneous display of four radar images with the aid of a single videographic memory.

All the functions of a conventional console may be performed. This permits an easy ergonomic study of new functions which are possible with the use of a graphic station and a radar videographic memory, in particular, as concerns the after glow laws and the use of colours.

What is claimed is:

1. A device for converting data from a radar for display on at least one screen of a television monitor associated with a videographic memory, the radar signals comprising at least one videographic signal and scanning data, said device including:
   processing means, said processing means for processing said radar videographic signal;
   digitizing means, connected to said processing means for digitizing said videographic signal;
   videographic signal converting means connected to said digitizing means for compressing said digitized videographic signal;
   intermediate memory means, connected to said videographic signal converting means for receiving and storing said compressed videographic signal;
   distance marker generating means, receiving radar data through differential amplifier means and clock management means, for generating distance markers said distance marker generating means connected to said intermediate memory means, said intermediate memory means receiving outputs from both said videographic signal converter means and said distance marker generating means;
   polar to cartesian converting means for receiving radar data through differential receiver means, and converting said data from polar coordinates to cartesian coordinates;
   output buffer memory means, connected to said polar to cartesian converting means receiving and storing output of said polar to cartesian converting means and output of said intermediate memory means said intermediate memory means containing said compressed videographic signal and said distance markers;
   a radar data interface means connected to said output buffer memory means, for transmission of control orders to a converting means for controlling said videographic memory associated with said television monitor, as a function of the data contained in said output buffer memory means;
   after glow processing means connected to said radar data interface means and also connected to said videographic memory; said after glow processing means being adapted to control selected zones of said video memory based on a mathematical treatment formula, to produce a pseudo after glow phenomenon of selected points of said image display on said television monitor.

2. A device as claimed in claim 1, wherein said after glow processor means being further adapted to control a decrease of said radar image luminosity in both in space and in time.

* * * * *